Oct. 4, 1927.

S. E. SANDERSON 1,644,614

AUTOMATIC VARIABLE SPEED TRANSMISSION

Filed April 7, 1926   3 Sheets-Sheet 2

S. E. Sanderson INVENTOR

BY Victor J. Evans

ATTORNEY

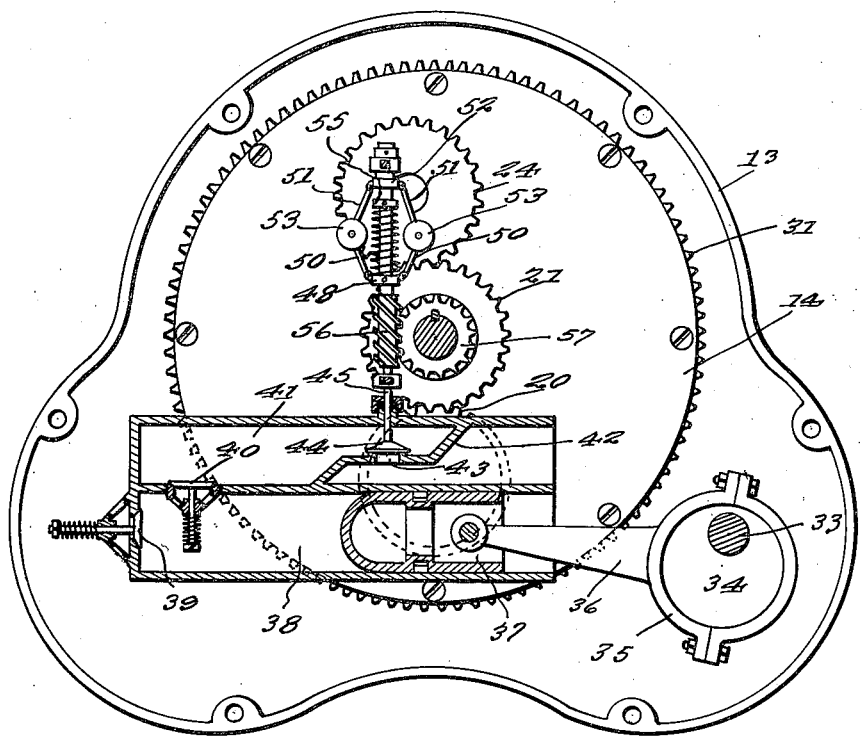

Patented Oct. 4, 1927.

1,644,614

UNITED STATES PATENT OFFICE.

SAMUEL E. SANDERSON, OF BROOKLYN, NEW YORK.

AUTOMATIC VARIABLE-SPEED TRANSMISSION.

Application filed April 7, 1926. Serial No. 100,377.

This invention relates to variable speed transmission mechanisms and has for an object the provision of a reversible, variable speed mechanism, by means of which change of speed between a drive and driven shaft may be effected without disengaging a clutch, or interfering with the transmission of power while the change is being made.

Another object of the invention is the provision of automatic means controlled by the speed of the drive shaft for regulating the speed ratio of the shafts without disengaging the gears, or providing a step by step change, so that a smooth and gradual change of speed will be provided.

Another object of the invention is to provide an automatic speed change mechanism which is capable of use with water turbines, or other mechanisms where the drive shaft operates at an irregular rate of speed and it is necessary or desirable for the driven shaft to turn at a constant rate of speed.

With the above and other objects in view, the invention further includes the following novel features and details of construction, to be hereinafter more fully described, illustrated in the accompanying drawings and pointed out in the appended claims.

In the drawings:—

Figure 3 is a like view on the line 3—3 of Figure 1.

Figure 5 is an enlarged sectional view on the line 5—5 of Figure 1.

Figure 6 is a fragmentary elevation partly broken away showing one end of the connecting rod of the pump.

Figure 7 is an enlarged vertical sectional view of the pump valve and its operating mechanism.

Figure 8 is an enlarged transverse section on the line 8—8 of Figure 7.

Figure 9 is an enlarged elevation of the upper end of the valve rod.

Figure 1:
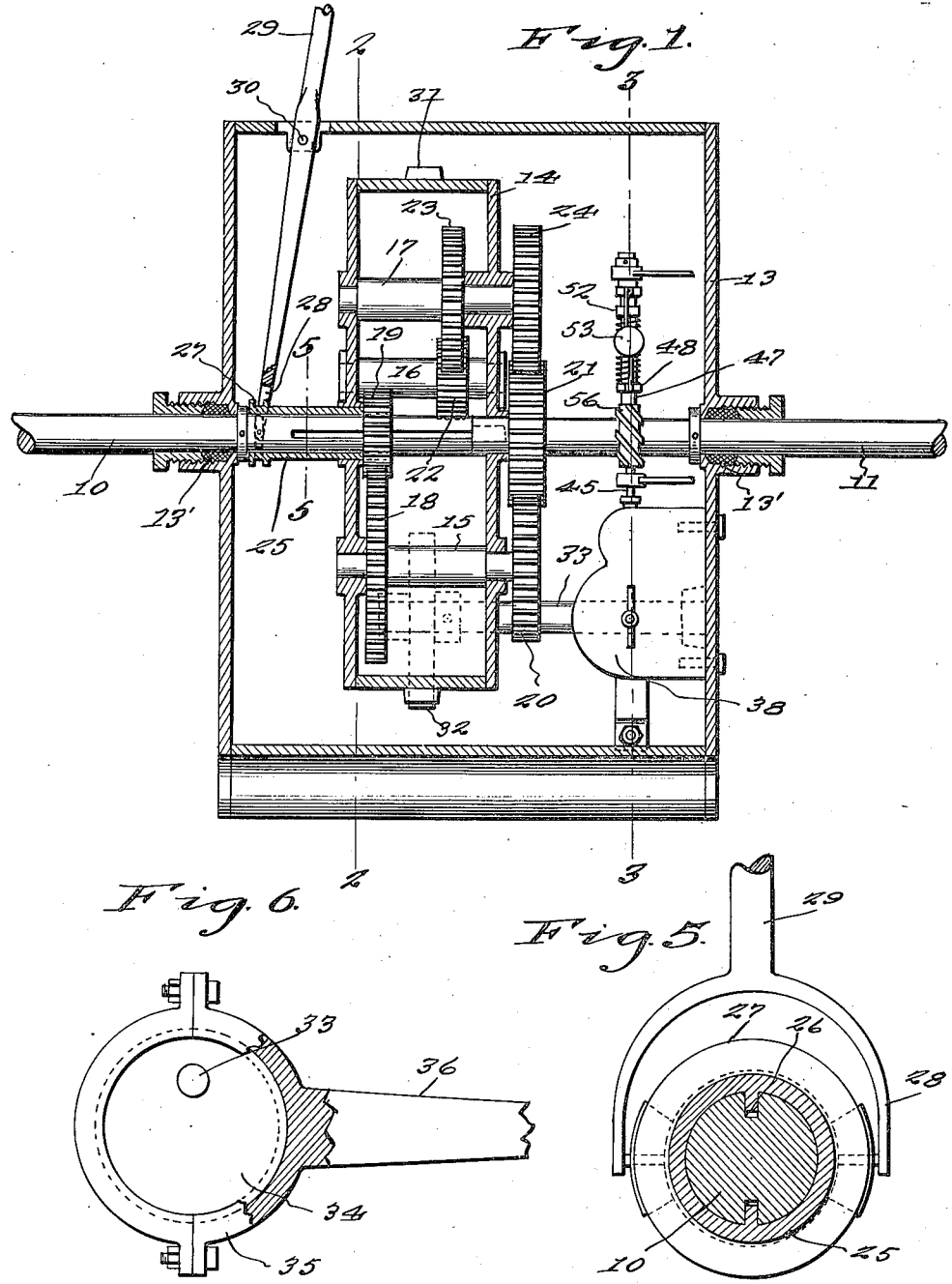
Figure 1 is a sectional view illustrating the mechanism associated with a drive and driven shaft.
Figure 2:
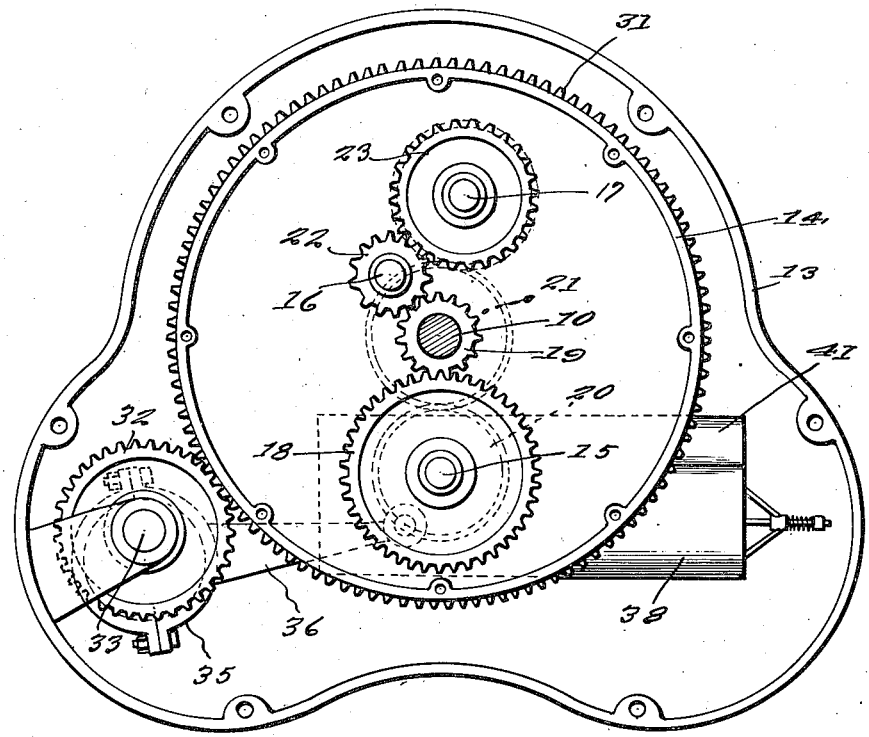
Figure 2 is a sectional view taken substantially on the line 2—2 of Figure 1.
Figure 4:
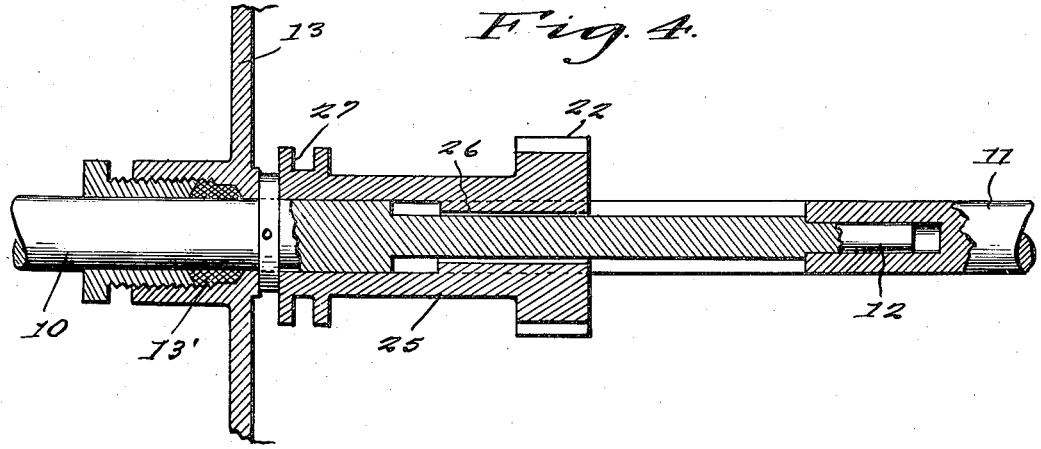
Figure 4 is an enlarged fragmentary section taken longitudinally of the drive shaft.

Referring to the drawings in detail wherein like characters of reference denote corresponding parts, the reference character 10 indicates a portion of a drive shaft, for example, the drive shaft of an automobile engine or other power unit and 11 indicates a driven shaft. The shafts 10 and 11 are aligned and their adjacent ends may be connected as indicated at 12 so as to permit of independent and relative rotation. The meeting ends of the shafts 10 and 11 arranged within a suitable housing 13 and extend through packing glands 13'.

Freely rotatable upon the adjacent ends of the shafts 10 and 11 is a member 14 which is preferably in the form of a drum. This member carries countershafts 15, 16 and 17. The shaft 15 carries a gear 18 and the latter is engaged by a pinion 19 which is rotatable with the shaft 10. The gear 18 is located within the drum 14 while upon the outside of the drum, the shaft 15 has secured thereon a gear 20 which engages a gear 21 fast upon the shaft 11. The gears 20 and 21 are of the same ratio, while the gear 18 and the pinion 19 are of a different ratio, so that when the drum 14 is held stationary (by means hereinafter described) power will be transmitted from the drive shaft through the gearing just described to the driven shaft and the latter will be rotated at a reduced speed due to the difference of ratio between the gear 18 and pinion 19.

Mounted upon the shaft 16 is a pinion 22 which is of the same ratio as the pinion 19. The pinion 22 engages a gear 23 which is fast upon the shaft 17 and which is of a diameter to rotate the shaft 17 at speed less than the speed of rotation of the shaft 16. Also secured upon the shaft 17 upon the outside of the drum 14 is a gear 24 of the same ratio as the gear 23, or any other suitable ratio. The gear 24 engages and drives the gear 21 at the same speed as the speed of the shaft 17, the gears 21 and 24 being of equal ratio.

The pinion 19 which is rotated by the shaft 10 is mounted upon one end of a sleeve 25 and this sleeve is splined upon the shaft 10 as shown at 26. The opposite end of the sleeve 25 is provided with a collar 27 which is engaged by the yoke 28 of a shift lever 29, the latter being pivotally mounted as shown at 30. By means of the lever 29, the sleeve 25 may be moved longitudinally of the shaft 10 so as to cause the pinion 19 to engage either the gear 18, or the pinion 22. When engaged with the gear 18 the shaft 14 will be driven in the same direction as the shaft 10, but when engaged with the pinion 22 the direction of rotation of the shaft 11 will be reversed to that of the shaft 10.

The drum 14 is provided upon its circumference with teeth 31, so that this drum provides a gear which is engaged by a gear 32. This last mentioned gear is mounted upon a shaft 33 which has also mounted thereon an eccentric 34. The eccentric is surrounded by a band 35 which carries an arm or rod 36. This rod is connected to a piston or plunger 37 which operates within a pump cylinder 38 and the latter is provided with a suction operated check valve 39. A pressure operated check valve 40 provides communication between the cylinder 38 and a passage 41 within which there is located a partition 42. This partition is provided with a port 43 which is controlled by a valve 44. The stem 45 of this valve is capable of longitudinal movement but is held against rotation by means indicated at 46. The stem 45 operates within a sleeve 47 and is operatively associated with a collar 48 through slots 49 provided in the sleeve 47, so that the collar may move longitudinally of the sleeve and carry with it the rod 45.

Pivotally secured to the collar 48 are arms 50 which are also pivotally secured to arms 51, the latter being pivotally secured to a collar 52 which is rigid with the sleeve 47. The arms 50 and 51 carry balls or weights 53. Outward movement of the balls is resisted by a spring 54 whose tension is adjusted by an adjustable collar 55.

The sleeve 47 has secured thereon a worm 56 which is engaged by a worm gear 57 fast upon the shaft 11.

With the drive shaft 10 operating at a relatively low speed and the pinion 19 engaged with the gear 18, the drum 14 will be locked against rotation by engagement of the teeth of the gear 31 with the gear 32 so that the drive will be through the shaft 15, the gear 20 and the gear 21 to the shaft 11, the latter rotating at a less speed than that of the shaft 10. As the speed of the drive shaft is increased through acceleration of the motor, or other means, the speed of the driven shaft 11 will be correspondingly increased. When the shaft 11 attains a predetermined speed which is governed by the tension of the spring 54 of the governor, the latter will operate to lift the valve 44 and permit of a circulation of fluid through the pump cylinder 38. Pressure of fluid within the cylinder 38 will be relieved from the piston or plunger 37 so that the latter will be permitted to move. This movement is due to the tendency of the drum to rotate and drive the gear 32 and operate the pump. The rapidity of movement is governed by the degree of movement of the valve 44 and the latter is controlled by the governor, so that the gears 18 and 20, which are of a different ratio, will tend to lock with the pinion 19 and gear 21. The drum 14 and the gears which are carried by the drum will thus operate as a unit and the shaft 11 will be rotated at the same or substantially the same speed as the shaft 10, the difference in speed being governed by the speed of operation of the pump.

The invention is susceptible of various changes in its form, proportions and minor details of construction and the right is herein reserved to make such changes as properly fall within the scope of the appended claims.

Having described the invention what is claimed is:—

1. In combination, a pair of axially aligned independently rotatable shafts, including a drive shaft and a driven shaft, a drum rotatable upon the adjacent ends of the respective shafts, reduced gearing including drum carried gears capable of rotation relative to the drum and gear carried by each shaft and engaged by the drum carried gears, a shaft, a gear mounted thereon, teeth arranged about the circumference of the drum and meshing with the last mentioned gear to hold the drum stationary to permit rotation of the driven shaft at a less speed than the speed of rotation of the drive shaft, a fluid pump including a cylinder, a partition dividing the cylinder into separate communicating compartments, a normally closed valve controlling said communication and adapted to be opened by fluid pressure, a piston operating in one of said compartments, a piston rod connected with the last mentioned shaft, the operation of the pump regulating the rotation of said drum, and means including a governor actuated valve controlled by the speed of rotation of the driven shaft to control the operation of the pump.

2. In combination, a pair of axially aligned independently rotatable shafts, including a drive shaft and a driven shaft, a drum rotatably mounted upon the adjacent ends of the respective shafts, reduced gearing including drum carried gears capable of rotation relative to the drum and gear carried by each shaft and engaged by the drum carried gears, a circumferential series of teeth carried by the drum, a shaft, a gear carried thereby and meshing with said teeth on the drum to hold the drum against rotation to permit the driven shaft to rotate at a less speed than the speed of rotation of the drive shaft, a fluid pump including a cylinder divided into communicating compartments, a normally closed pressure actuated valve controlling said communication, an eccentric mounted on the last mentioned shaft, a piston operating in one of said compartments, a piston rod connected with said eccentric, a partition arranged in the other compartment and provided with a port, means to prevent operation of the pump to hold the drum against rotation until the driven shaft reaches a predetermined speed, and a governor actuated valve for said port, controlled by the speed of rotation of the driven shaft to control the pump holding means.

In testimony whereof I affix my signature.

SAMUEL E. SANDERSON.